F. CLARK.
DRAFT EQUALIZER.
APPLICATION FILED MAR. 31, 1909.
950,840.
Patented Mar. 1, 1910.
3 SHEETS—SHEET 3.
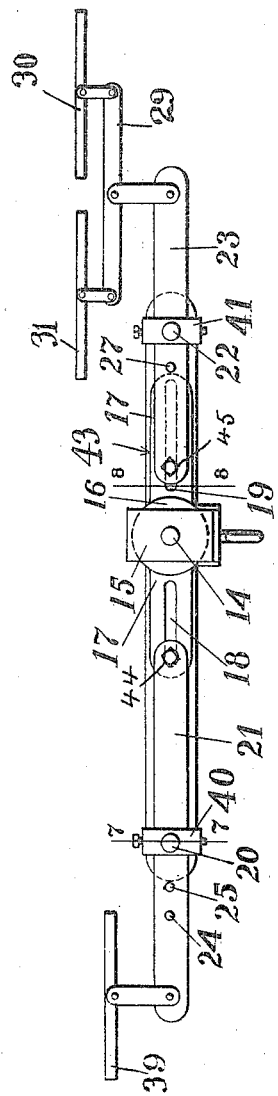
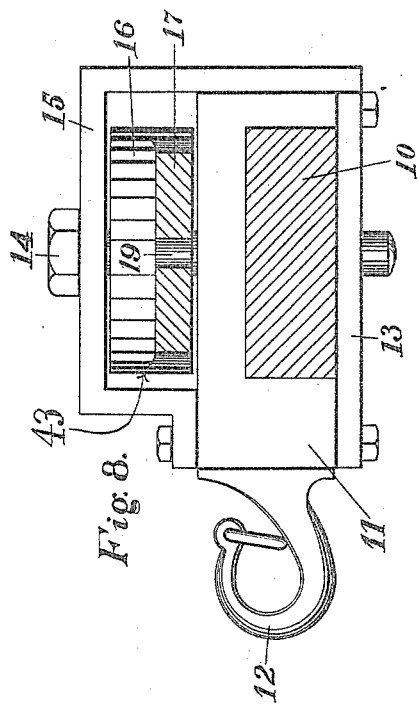
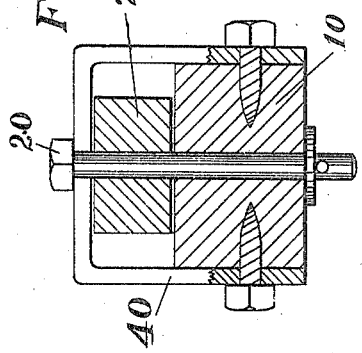
Frank Clark, Inventor

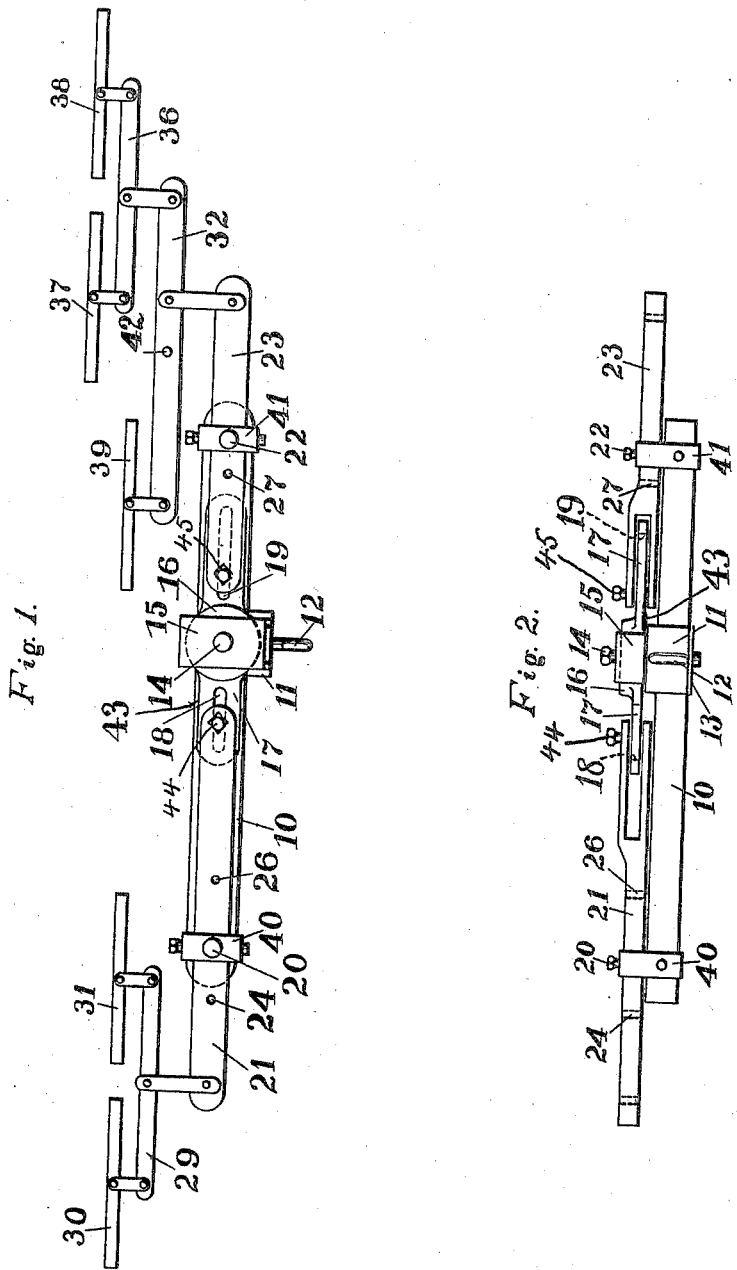

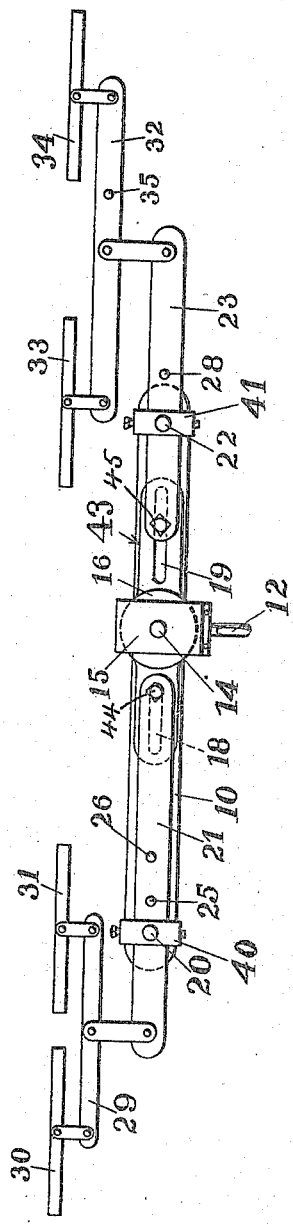
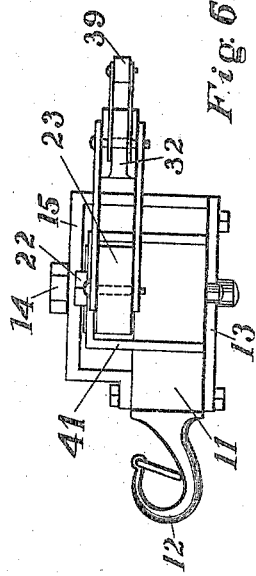
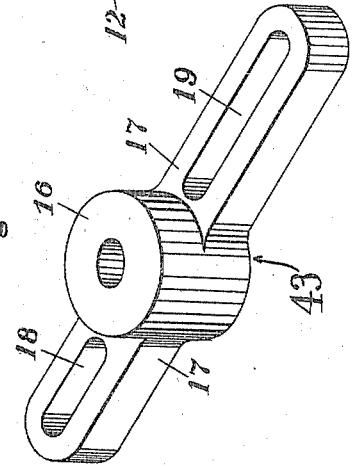

UNITED STATES PATENT OFFICE.

FRANK CLARK, OF MARSHALL, OKLAHOMA.

DRAFT-EQUALIZER.

950,840.　　　　Specification of Letters Patent.　　Patented Mar. 1, 1910.

Application filed March 31, 1909.　Serial No. 487,027.

*To all whom it may concern:*

Be it known that I, FRANK CLARK, a citizen of the United States, residing at Marshall, in the county of Logan, State of Oklahoma, have invented certain new and useful Improvements in Draft-Equalizers; and I do hereby declare the following to be a full, clear, and exact description of the invention, such as will enable others skilled in the art to which it appertains to make and use the same.

This invention relates to draft equalizers, of the class wherein provision is made for hitching 3, 4, or 5 horses to a sulky gang or walking plow, lister or similar devices, and has for one of its objects to improve the construction and increase the efficiency and utility of devices of this character.

With this and other objects in view, the invention consists in certain novel features of construction as hereafter shown and described and then specifically pointed out in the claims, and in the drawings illustrative of the preferred embodiment of the invention, Figure 1 is a plan view of the improved device arranged for five horses. Fig. 2 is a rear elevation of the same with the draft appliances detached. Fig. 3 is a plan view of the device arranged for four horses. Fig. 4 is a plan view of the device arranged for three horses. Fig. 5 is a perspective view, enlarged, of the slotted lever arm detached. Fig. 6 is an end elevation, enlarged, of the device. Fig. 7 is a section, enlarged, on the line 7—7 of Fig. 4. Fig. 8 is a section, enlarged, on the line 8—8 of Fig. 4.

The improved device comprises a main beam 10, preferably of wood, of sufficient strength to withstand the strains to which it will be subjected. Attached to the beam 10 at one side of the center is a clevis device comprising a base member 11 having a draft hook 12 extending from its rear end and with a plate 13 connected to the member 11 and extending beneath the beam. The member 11 is provided with a central aperture registering with a corresponding aperture in the beam, and through which a pin 14 extends, the pin projecting for a distance above the member 11.

Connected at its ends to the member 11 is an arching plate 15 forming a housing for the central portion 16 of an arm represented as a whole at 43 and extending for a relatively long distance over the shorter end of the beam and extending for a relatively short distance over the longer end of the beam. The end portions 17 of the arm 43 are longitudinally slotted as indicated at 18—19. The pin 14 extends through the housing 15, the central portion 16 of the arm 43, the member 11, and likewise through the beam 10 and the plate 13, as shown. By this means the arm 43 is pivotally coupled to the clevis member and to the beam.

Pivoted at 20 to the beam 10 at the terminal of its longer portion is a relatively long lever 21, and similarly pivoted at 22 to the beam 10 at the terminal of its shorter portion is a relatively short lever 23. The lever 21 is provided with spaced apertures 24—25 and 26, while the lever 23 is provided with spaced apertures 27—28. The intermediate aperture 25 is located at about one-third of the distance from one end of the lever 21, while the aperture 28 is located at about the center of the lever 23. The apertures 24—26 are located at opposite sides of the intermediate apertures 25, while the aperture 27 is located toward the inner end of the lever 23, as shown. These apertures are designed to enable the leverage of the various parts to be alternated to adapt the device to three, four, or five horses as hereafter explained. At their inner ends the arms 21—23 are forked as shown in Fig. 2 and bear by their forked portions over the terminals 17 of the arm 43, and pivoted respectively thereto by bolts 44—45. By this means the levers 21—23 are movably coupled to the arm 43, and adapted to be adjusted longitudinally thereof within the range of the slots 18—19.

An ordinary double tree 29 together with its swingle trees 30—31 is provided, and another double tree 32 with its swingle trees 33—34 is also provided, the latter double tree having a central aperture 42 and a secondary aperture 35 spaced from the aperture 42. An extra double tree 36 together with its swingle trees 37—38 and a surplus swingle tree 39 are also provided as a part of the improved device.

The beam 10 is provided with sheet metal housings or clips 40—41 to support the pins 20—22, as shown.

The arm 43, and the levers 21—23 are preferably constructed of metal, while the beam 10, as before stated, will preferably be of wood, but it will be understood that it is not desired to limit the invention to any specific material for the various parts.

With a device thus constructed the farmer can easily transform the device for employing three, four, or five horses, by simply changing the location of the various coupling pins, and without destroying any of the parts.

In Fig. 1 the improved device is shown arranged for five horses, and when thus arranged the pin 20 will be located through the intermediate aperture 25 of the lever 21 and the pin 22 will be located through the aperture 28 of the lever 23. The coupling pin of the double tree 32 will be located through the aperture 35 and the surplus double tree 36 with its swingle tree 37—38 and the surplus swingle tree 39 will be coupled to the double tree 32, while the double tree 29 with its swingle trees 30—31 will be coupled to the shorter end of the lever 21, as shown. By this means three horses will be coupled to the shorter end of the beam 10, while two horses will be coupled to the longer end of the beam, the leverage being thus equalized between the two horses connected to the swingle trees 37—38 and the single horse connected to the swingle tree 39.

In Fig. 3 is shown the arrangement of the parts for employing four horses, and in this arrangement the pin 20 is passed through the aperture 24 of the lever 21 and the pin 22 passed around the aperture 27 of the lever 23, while the double tree 32 is coupled centrally of its ends to the longer end of the lever 23.

In Fig. 4 is shown the arrangement of the parts for coupling three horses to the device, and in that event the pin 20 is passed through the aperture 26 of the lever 21 and the pin 22 passed through the aperture 28 of the lever 23 and the double tree 32 with its swingle trees 33—34 replaced with the doubletree 29 with its swingle-trees 30—31, and the surplus swingle tree 39 coupled to the lever 21, thus giving the single horse the advantage of the leverage, and equalizing the draft of all the horses.

The improved device is simple in construction, can be inexpensively manufactured and quickly changed to a three, four or five horse equalizer, as described.

What is claimed is:—

1. A draft equalizer comprising a main beam, an arm having longitudinal slots at the ends and mounted to swing at one side of the center thereof upon said beam, a relatively long lever having a plurality of pin apertures spaced apart intermediate the ends thereof, a relatively short lever having a plurality of pin apertures spaced apart intermediate the ends thereof, pins at the ends of said main beam and over which the apertures of said levers are detachably arranged, pins carried by said levers and engaging through the slots of said arm, and draft appliances connected to said levers.

2. A draft equalizer comprising a main beam, a clevis member connected to said beam intermediate the ends thereof, a pin extending through said clevis member and the beam, an arm having longitudinal slots at the ends and mounted to swing upon said clevis engaging pin, a relatively long lever having a plurality of pin apertures spaced apart intermediate the ends thereof, a relatively short lever having a plurality of pin apertures spaced apart intermediate the ends thereof, pins at the ends of said main beam and over which the ends of said levers are detachably arranged, pins carried by said levers and engaging through the slot of said arm, and draft appliances connected to said levers.

In testimony whereof, I affix my signature, in presence of two witnesses.

FRANK CLARK.

Witnesses:
W. A. KELLEY,
PERLY BERRUS.